United States Patent Office 3,695,830
Patented Oct. 3, 1972

3,695,830
METHOD OF TREATING SODIUM BICARBONATE RECOVERED FROM ADIPONITRILE PRODUCING REACTION SOLUTIONS TO RECOVER SODIUM CARBONATE AND ORGANIC SUBSTANCES DEPOSITED THEREON
Hiroo Watanabe, Fujisawa, Koosuke Yamamoto, Kamakura, Takeshi Abe, Fujisawa, and Motoo Kawamata, Yokohama, Japan, assignors to Mitsui Toatsu Chemicals, Incorporated, Tokyo, Japan
No Drawing. Filed May 26, 1969, Ser. No. 827,895
Claims priority, application Japan, May 31, 1968, 43/36,670; June 1, 1968, 43/37,062
Int. Cl. C07c 121/26; C01d 7/12
U.S. Cl. 423—206                                    9 Claims

ABSTRACT OF THE DISCLOSURE

Method of treating sodium bicarbonate by-produced in the production of adiponitrile by hydrodimerizing acrylonitrile by means of sodium amalgam and carbon dioxide in an aqueous solution of acrylonitrile in the presence of a catalyst and/or solvent, comprising the steps of separating by-produced sodium bicarbonate from the reaction solution, washing it with acrylonitrile and calcining the washed sodium bicarbonate at a temperature of 70 to 300° C. to convert it to sodium carbonate and at the same time to recover the organic substances deposited on the sodium bicarbonate.

BACKGROUND OF THE INVENTION (a) Field of the invention

This invention relates to a method of treating sodium bicarbonate recovered from adiponitrile producing reaction solutions and more particularly to a method of treating sodium bicarbonate by-produced in the production of adiponitrile (hereinafter called ADN) by hydrodimerizing acrylonitrile (hereinafter called AN) by means of sodium amalgam and carbon dioxide in an aqueous solution of AN in the presence of a catalyst and/or solvent.

(b) Description of the prior art

In the process for producing ADN by hydrodimerizing AN in aqueous solution with sodium amalgam, sodium in the amalgam reacts with water to produce sodium hydroxide and the reaction system becomes alkaline. Therefore, the reaction system usually has been neutralized by some method. A method of neutralizing such reaction systems with an acid such as hydrochloric acid, sulfuric acid, nitric acid, phosphoric acid or carbonic acid is already known. However, in order to keep the pH of the reaction system as constant as possible, it is desirable to use an acid having a buffer action. Particularly, in the case of using carbonic acid as a neutralizing agent, it is possible and therefore very advantageous to blow it into the reaction solution in the form of gaseous carbon dioxide to also agitate the system.

When carbon dioxide is used as the neutralizing agent, sodium hydroxide and carbonic acid react with each other to produce sodium bicarbonate and sodium carbonate. The ratio of the produced sodium bicarbonate and sodium carbonate varies with the ratio of the reaction velocity of the sodium in the amalgam and the feed rate of the neutralizing carbonic acid ions. When the amount of sodium ions is greater and the amount of carbonic acid ions is less, more sodium carbonate will be produced. When the amount of sodium ions is less and the amount of carbonic acid ions is greater, more sodium bicarbonate will be produced. Generally, since the reaction is usually carried out in an excess of carbon dioxide in order to prevent an increase in pH of the reaction system, the amount of production of sodium carbonate is smaller than the amount of production of sodium bicarbonate. Therefore, the mixture of predominantly sodium bicarbonate and smaller amounts of sodium carbonate shall be referred to merely as the sodium bicarbonate hereinafter. The present invention relates to a method of treating such sodium bicarbonate containing small amounts of sodium carbonate.

When carbon dioxide is used as a neutralizing agent in producing ADN by hydrodimerizing AN with sodium amalgam, the solution after the completion of the reaction contains not only sodium bicarbonate, AN and the reaction product ADN but also, in most cases, solvent and catalyst. Thus, the reaction system also contains an organic solvent such as dimethylformamide, dimethylacetamide, acetonitrile, hexamethyl-phosphamide or dimethylsulfoxide and catalyst for inhibiting secondary reactions such as small amounts of tetralkylammonium salt, tetralkylphosphonium salt, tetralkylarsonium salt, trialkylphosphine, phosphine metallic salt compound, nitrilotriacetic acid or metallic acetylacetone. The reaction system also contains such reaction by-products as propionitrile, ethylenecyanohydrin, succinonitrile, methylglutalonitrile, bis-cyanethylether or an oligomer of AN.

The amount of sodium bicarbonate produced is about 1.5 times by weight as large as the amount of ADN produced. In order to reduce the amount of the reaction solution to be handled during the recovery operation, the concentration of the produced ADN in the solution after the completion of the reaction may be increased by any suitable means, e.g., evaporation. However, the solubility of the by-produced sodium bicarbonate in the reaction solution is so low that the greater part of the produced sodium bicarbonate is present as a crystal in the reaction solution and after completion the reaction solution becomes a slurry.

The reaction solution containing sodium bicarbonate is separated (as it is or after separating the mercury with a settling separator having an agitator) into a sodium bicarbonate crystal phase and a solution phase with a filtering apparatus or centrifugal separator. The present invention relates to a method of treating sodium bicarbonate thus separated from the reaction solution.

Since the separated sodium bicarbonate crystals contain generally 10 to 50% of the reaction solution, it is necessary to effectively recover the above mentioned organic substances contained in the reaction solution.

When the solution-containing sodium bicarbonate crystals are heated and dried or calcined as it is so as to convert it to sodium carbonate and at the same time to evaporate, separate and recover the organic substances, not only are ADN and other high boiling point substances so high in boiling point that it is difficult to efficiently recover them, but, due to the presence of a large amount of such high boiling point substances as the oligomer, there results the deposition of sodium carbonate and other materials on the calcining furnace wall.

SUMMARY OF THE INVENTION

An object of the present invention is to effectively recover organic substances deposited on sodium bicarbonate which has been separated from a reaction solution which has produced adiponitrile.

Another object of the present invention is to produce sodium carbonate from sodium bicarbonate separated from a reaction solution which has produced adiponitrile.

A further object of the present invention is to produce sodium carbonate of high purity from sodium bicarbonate separated from a reaction solution which has produced adiponitrile.

As a result of making various researches in order to attain the above mentioned objects, we have discovered that, when sodium bicarbonate separated from a reaction solution which has produced adiponitrile is washed with AN and is then calcined at a temperautre of 70 to 300° C., the sodium bicarbonate can be converted to sodium carbonate and at the same time the organic substances deposited on the above mentioned sodium bicarbonate during production of ADN can be effectively recovered. We have further discovered that, when the thus obtained sodium carbonate is burnt at a higher temperature (as it is or after being made into a heavy ash), sodium carbonate of a high purity can be obtained.

When a sodium bicarbonate cake separated from a reaction solution is washed with AN, the reaction solution deposited on the sodium bicarbonate will be substantially replaced with AN, and ADN and other high boiling point substances are recovered in the washing solution. When the washed sodium bicarbonate is calcined at a temperature of 70 to 300° C., AN which is low boiling can be easily recovered. Further, when the thus obtained sodium carbonate is burnt at a higher temperature (as it is or after being made into a heavy ash), the remaining organic substances will be burnt and thus removed and sodium carbonate of a high purity is produced.

In recovering the high boiling point organic substances in the sodium bicarbonate cake, such other organic solvents as the above mentioned solvents, methanol, ethanol or acetonitrile can be used in the same manner. However, when such organic solvent is used, it is expensive to separate and recover and is uneconomical. AN used as a washing solution in the present invention is a raw material used in the reaction and therefore the process can be simplified and made very economical by using AN as the washing medium. The AN washing step of the present invention includes also the operation of re-mixing and suspending sodium bicarbonate with AN and then filtering it.

In the present invention, when sodium bicarbonate is calcined to convert it to sodium carbonate, carbon dioxide on a mol for mol basis with sodium carbonate will be produced. Therefore, the amount of gas produced during calcination is large and the recovery of the organic substances (as by cooling and condensation) is comparatively easy. Thus, such high boiling point substances as ADN can be evaporated and recovered to some extent. The amount of AN used for the washing need not always be large but may well be about 1 to about 7 times or generally about 2 to about 4 times as large as the amount of the sodium bicarbonate on a weight basis.

A calcining temperature above about 70° C. can be well used. When the calcining temperature is low, not only the velocity of conversion of sodium bicarbonate to sodium carbonate is low but also the polymerizing and hydrolyzing reactions of the organic substances contained in the sodium bicarbonate occur more readily and the recovery of such organic substances is not sufficient. The calcination may well be at a higher temperature. However, since there is no specific advantage in calcination at a higher temperature, the proper calcining temperature is in the range of about 70° C. to about 300° C., preferably about 150° C. to about 250° C. and most preferably about 160° C. to about 230° C. Particularly, when the amount of AN used for washing is small or about twice by weight (or less) as large as that of sodium bicarbonate, it is advantageous to calcine above 170° C.

The calcining time is a time sufficient to recover the organic substances and is related to the calcining temperature. Usually about 20 minutes to about 2 hours in the above mentioned temperature range is preferred.

Sodium carbonate of a high purity then can be produced by burning the calcined crude sodium carbonate as it is at a high temperature. However, since the calcined crude sodium carbonate has the defect that it is a light ash and is therefore likely to fly as a powdery dust, it is preferable to convert it to a heavy ash.

In making a heavy ash, there can be used the generally used operation of making heavy ashes wherein a light ash is mixed with about 16 to about 18% water based on the weight of ash or is once dissolved in water and crystallized. The method wherein the light ash is once dissolved in water and crystallized is a general method of refining inorganic and organic compounds. It is not always effective to apply this method to the light ash after calcination in the present invention. In order to sufficiently refine the light ash through dissolution and crystallization, a large amount of active carbon is required. Since a considerable amount of organic substances which are hard to adsorb on active carbon is contained by the light ash, an amount of active carbon which is economically reasonable does not give adequate results. If the crystallized sodium carbonate is washed with a large amount of water, some refined product can be obtained but it is difficult to circulatively use the mother solution, the loss of sodium carbonate is large and it is not economical. Therefore, even when heavy ashes are made by dissolving the light ash in water and crystallizing it, it is necessary to apply the burning step of the present invention. Thus, when treating sodium bicarbonate by-produced in the production of ADN, a firing step is required. Therefore, the method wherein the light ash is dissolved in water and crystallized to make a heavy ash is not economically valuable except when it is necessary to remove inorganic substances which are hardly soluble or soluble in water such as are contained in the light ash.

The proper burning temperature for the crude calcined sodium carbonate is a temperature above about 250° C. However, at high temperatures above about 850° C., sodium carbonate reacts with iron oxide to produce sodium ferrate which causes coloring and has a bad influence on the quality of the sodium carbonate product. When the burning temperature is lower, the combustion of the organic substances is insufficient and it is necessary to refine the resulting sodium carbonate product by recrystallization or the like. Therefore, the burning temperature must be about 250° C. to about 850° C., preferably about 350° C. to about 800° C. and particularly preferably about 550° C. to about 750° C. The burning time is related to the temperature but is usually about 15 minutes to about 2 hours.

The two-step, heat-treating method wherein sodium bicarbonate by-produced in the porduction of ADN is calcined and then burnt as described above is economical and provides highly refined sodium carbonate.

The burning heat source may be any ordinary means. It is possible to use a solid, liquid or gas fuel. The burning apparatus to be used may be any adapted to the fuel. The heating apparatus may be of any of the material placing, conveying and agitating types. However, apparatus of the rotary aerating type, groove type or cylinder or flat plate agitating type are preferable. For the system of contacting the material with hot air in each apparatus, it is possible to use either direct or indirect heating and either counter-current or parallel current types.

DESCRIPTION OF SPECIFIC EMBODIMENTS

The following examples are presented wherein, unless otherwise specified parts and percentages are by weight and temperatures are on the centigrade scale.

Example 1

Sodium bicarbonate by-produced in the production of ADN by hydrodimerizing AN using dimethylformamide as solvent was centrifugally separated and then washed with AN in a weight amount about 3 times as large as the weight of the solid sodium bicarbonate on a dry basis. The analysis values of the washed sodium bicarbonate cake were 71.8% sodium bicarbonate, 27.2% AN, 0.63% water, 0.14% ADN, 0.23% dimethylformamide and a small amount of other organic substances (the oligomer was generally about 3 to 8% based on the weight of ADN).

One kg. of this liquid-containing sodium bicarbonate cake was calcined at 210° C. for 1 hour in a steam heated revolving furnace. In this case, 99.1% of the AN, 97.4% of the ADN and 98.0% of the dimethylformamide contained in the cake were recovered by means of a cooler attached to the calcinator. The thus produced light ash was well mixed with 17% water based on the weight of the light ash and then burned at 550° C. for 30 minutes in a hot air, heated rotary firing device. When the refined sodium carbonate was analyzed according to JIS K 1201–1959, the apparent specific gravity was 1.14, the amount of reduction by heating was less than 0.01%, the total alkalis (as converted to $Na_2CO_3$) were 99.3%, the sodium chloride was less than 0.003% and the water-insoluble part was 0.14%, the percentages being based on the total weight of the refined sodium carbonate. Furthermore, when this refined sodium carbonate was made up into an aqueous solution of 10 wt. percent and the absorbency at 420 m$\mu$ was measured, the absorbency was 99.5% and substantially no coloring was observed.

Example 2

The recovery procedure of Example 1 was repeated using no AN wash and also using different amounts of AN to wash the cake and analyses of the unwashed and washed cakes are given in Table I. The recovery procedure of Example 1 was repeated on cakes obtained by centrifugally separating sodium bicarbonate by-produced in the production of ADN by hydrodimerizing AN using, respectively the solvents listed in Table II. Tables I and II show the analyses of the calcined cakes. Table I shows the analyses of the cakes after washing with no AN and when washed with different amounts of AN performed on sodium bicarbonate by-produced in and centrifugally separated from the hydrogenating dimerizing reaction using dimethylformamide as the solvent. Table II shows the analyses of cakes after washing with AN in an amount 3 times as large as the weight of sodium bicarbonate by-produced in and centrifugally separated from hydrodimerizing reaction using other solvents in place of dimethylformamide. The amounts of oligomer and other reaction by-products were so small as to be meaningless and their analysis values are omitted. Table III shows the percentages of AN, ADN and solvent in the washed cakes which are recovered by calcining. Table IV shows the analysis of the sodium carbonate after calcination when analyzed according to JIS K 1201–1959 and the measurement of absorbency at 420 m$\mu$ of an aqueous solution of 10% sodium carbonate.

TABLE I.—ANALYSIS OF CAKES RESULTING FROM HYDRODIMERIZING PROCESS USING DIMETHYLFORMAMIDE AS SOLVENT

| Sample No. | Amount of AN used in washing the cake (in times the weight of cake) | Composition of the cake after washing with AN (in percent by weight) | | | | |
|---|---|---|---|---|---|---|
| | | Sodium bicarbonate | AN | ADN | Water | Dimethylformamide |
| 1 | 0 | 73.4 | 3.54 | 7.90 | 3.16 | 12.00 |
| 2 | 3 | 71.8 | 27.20 | 0.14 | 0.63 | 0.23 |
| 3 | 5 | 70.2 | 29.17 | 0.08 | 0.40 | 0.15 |
| 4 | 7 | 71.5 | 28.02 | 0.06 | 0.31 | 0.11 |
| 5 | 10 | 70.9 | 28.82 | 0.04 | 0.18 | 0.06 |
| 6 | 15 | 70.1 | 29.71 | 0.03 | 0.12 | 0.04 |

TABLE II.—ANALYSIS OF CAKES RESULTING FROM HYDRODIMERIZING PROCESSES USING DIFFERENT SOLVENTS (The washing AN was in an amount 3 times as large as the weight of the cake)

| Sample No. | Kind of solvent | Composition of the cake after washing with AN (in percent by weight) | | | | |
|---|---|---|---|---|---|---|
| | | Sodium bicarbonate | AN | ADN | Water | Solvent |
| 7 | Dimethylsulfoxide | 74.6 | 24.53 | 0.12 | 0.67 | 0.18 |
| 8 | Acetonitrile | 68.9 | 30.24 | 0.06 | 0.58 | 0.22 |
| 9 | Dimethylacetamide | 70.6 | 28.54 | 0.11 | 0.61 | 0.14 |

TABLE III.—ORGANIC SUBSTANCES RECOVERED BY CALCINING

| Sample No. | Amount recovered (in wt. percent of the respective amounts in the washed cake) | | |
|---|---|---|---|
| | AN | ADN | Solvent |
| 1 | 98.4 | 88.3 | 96.7 |
| 2 | 99.1 | 97.4 | 98.0 |
| 3 | 99.0 | 97.7 | 96.2 |
| 4 | 99.2 | 94.5 | 95.3 |
| 5 | 99.1 | 92.5 | 97.6 |
| 6 | 98.9 | 92.4 | 94.9 |
| 7 | 98.4 | 96.6 | 97.8 |
| 8 | 96.8 | 95.8 | 98.2 |
| 9 | 98.2 | 96.4 | 98.1 |

TABLE IV.—ANALYSIS OF SODIUM CARBONATE AFTER CALCINING

| Sample No. | Apparent specific gravity (in g./cc.) | Amount of reduction by heating (in wt. percent) | Amount of total alkalis (in wt. percent $Na_2CO_3$) | Ferric oxide (in wt. percent) | Water insoluble part (in wt. percent) | Absorbency (in percent) |
|---|---|---|---|---|---|---|
| 1 | 0.83 | 0.48 | 98.8 | 0.0030 | 0.45 | 28.4 |
| 2 | 0.85 | 0.36 | 99.0 | 0.0029 | 0.36 | 34.1 |
| 3 | 0.72 | 0.41 | 99.7 | 0.0029 | 0.34 | 38.2 |
| 4 | 0.88 | 0.28 | 99.5 | 0.0030 | 0.25 | 41.6 |
| 5 | 0.79 | 0.33 | 99.4 | 0.0033 | 0.23 | 44.4 |
| 6 | 0.77 | 0.19 | 99.3 | 0.0032 | 0.22 | 45.9 |
| 7 | 0.78 | 0.33 | 99.3 | 0.0029 | 0.30 | 34.2 |
| 8 | 0.81 | 0.31 | 99.1 | 0.0028 | 0.24 | 50.0 |
| 9 | 0.83 | 0.28 | 99.2 | 0.0028 | 0.32 | 38.6 |

The calcined sodium carbonate in each case was mixed with 17 wt. percent of water based on the weight of the sodium carbonate and was burned at 550° C. for 0.5 hour in a hot air, heated rotary burning device, as described in Example 1. The results of the JIS analysis of the resulting refined sodium carbonate are shown in Table V, the weight percentages being based on the total weight of the fired sodium carbonate.

TABLE V.—ANALYSIS VALUES OF FIRED SODIUM CARBONATE

| Sample No. | Apparent specific gravity (in g./cc.) | Amount of reduction by heating (in wt. percent) | Amount of total alkalis (in wt. percent $Na_2CO_3$) | Ferric oxide (in wt. percent) | Water insoluble part (in wt. percent) | Absorbency (in percent) |
|---|---|---|---|---|---|---|
| 1 | 1.14 | <0.01 | 99.2 | 0.0029 | 0.13 | 99.5 |
| 2 | 1.14 | <0.01 | 99.3 | 0.0030 | 0.14 | 99.5 |
| 3 | 1.21 | <0.01 | 99.7 | 0.0029 | 0.12 | 99.5 |
| 4 | 1.17 | <0.01 | 99.2 | 0.0031 | 0.16 | 99.5 |
| 5 | 1.14 | <0.01 | 99.3 | 0.0030 | 0.12 | 99.6 |
| 6 | 1.11 | <0.01 | 99.4 | 0.0032 | 0.11 | 99.6 |
| 7 | 1.16 | <0.01 | 99.2 | 0.0028 | 0.12 | 99.5 |
| 8 | 1.14 | <0.01 | 99.4 | 0.0030 | 0.11 | 99.5 |
| 9 | 1.15 | <0.01 | 99.1 | 0.0030 | 0.10 | 99.6 |

Example 3

The calcined sodium carbonate sample No. 2 produced in Example 2 was mixed with 17 wt. percent of water based on its weight and was then burned. The influence of the burning temperature on the resulting refined sodium carbonate is shown in Table VI, the weight percentages being based on the total weight of the fired sodium carbonate.

TABLE VI.—ANALYSIS VALUES OF FIRED SODIUM CARBONATE

| Burning temperature (in °C.) | Apparent specific gravity (in g./cc.) | Amount of reduction by heating (in wt. percent) | Total alkalis (in wt. percent of $Na_2CO_3$) | Ferric oxide (in wt. percent) | Water insoluble part (in wt. percent) | Absorbency (in percent) |
|---|---|---|---|---|---|---|
| 250 | 0.85 | 0.08 | 99.1 | 0.0021 | 0.16 | 83.7 |
| 350 | 1.01 | <0.01 | 99.0 | 0.0032 | 0.12 | 96.4 |
| 450 | 1.19 | <0.01 | 99.0 | 0.0024 | 0.13 | 99.2 |
| 550 | 1.14 | <0.01 | 99.3 | 0.0030 | 0.14 | 99.5 |
| 650 | 1.25 | <0.01 | 99.2 | 0.0031 | 0.09 | 99.5 |
| 750 | 1.24 | <0.01 | 99.8 | 0.0029 | 0.11 | 99.6 |
| 850 | 1.52 | <0.01 | 99.7 | 0.0027 | 0.08 | 89.2 |

Example 4

The calcined sodium carbonate or light ash produced as sample No. 2 in Example 2 was treated in three different ways.

In case number 1, the light ash was burned, as it was, in the manner described in Example 1 (550° C. for 0.5 hour). In case number 2, the light ash was dissolved in water, the resulting solution was filtered, sodium carbonate was crystallized from the solution (by evaporation of water) and the resulting crystals were dried at 280° C. In case number 3, the light ash was treated in the manner described in case number 2 and the dried crystals were burned in the manner described in Example 1 (550° C. for 0.5 hour).

The analyses of the resulting sodium carbonate in each case are shown in Table VII where the weight percentages are based on the total weight of the resulting sodium carbonate.

A reaction solution consisting of 41% AN, 17% water and 42% dimethylformamide by weight was continuously introduced at a rate of 50 g./min. into an apparatus having a tower of a diameter of 30 mm. and a liquid height of 700 mm. from the lower part of the tower and a sodium amalgam of a sodium concentration of 0.069% by weight was dropped at a rate of 2 kg./min. from the upper part of the tower through a distributing plate having holes of a diameter of 8 mm. The pH of the reaction solution was adjusted to between 9 and 10 by blowing carbon dioxide into it from the lower part of the tower. The temperature during the reaction was kept at 35 to 40° C. When the by-produced sodium bicarbonate was separated from the overflowing reaction completed slurry by a centrifugal separator, there was obtained a reaction completed solution containing 12% AN, 28% ADN, 12% water, 43% dimethylformamide and 5% of the other compounds by weight.

Example 6

The hydrodimerizing reaction which by-produced the sodium bicarbonate treated as sample No. 7 in Example 2 was conducted as follows:

By the same reaction operating method as in Example 5 a reaction was conducted using a reaction solution consisting of 30% AN, 24% water and 46% dimethyl- TABLE VII.—ANALYSIS VALUES OF SODIUM CARBONATE RESULTING FROM DIFFERENT TREATMENTS OF LIGHT ASH OBTAINED BY CALCINING

| Sample | Apparent specific gravity (in g./cc.) | Amount of reduction by heating (in wt. percent) | Total alkalis (in wt. percent) $Na_2CO_3$ | Ferric oxide (in wt. percent) | Phosphorus insoluble part (in wt. percent) | Absorbency (in percent) |
|---|---|---|---|---|---|---|
| 1 | 0.86 | <0.01 | 99.2 | 0.0031 | 0.14 | 99.5 |
| 2 | 1.14 | 0.08 | 99.1 | 0.0013 | 0.08 | 84.3 |
| 3 | 1.16 | <0.01 | 99.3 | 0.0010 | 0.08 | 99.6 |

Note.—1. Light ash burned as it was without modification; 2. Light ash crystallized and dried at 280° C.; 3. Light ash crystallized, dried and burned.

Example 5

The hydrodimerizing reaction which by-produced the sodium bicarbonate treated in Example 1 and as samples Nos. 1 through 6 in Example 2 was conducted as follows:

sulfoxide by weight. Then, there was obtained a reaction completed solution containing 10% AN, 18% ADN, 20% water, 50% dimethylsulfoxide and 2% of the other compounds by weight.

Example 7

The hydrodimerizing reaction which by-produced the sodium bicarbonate treated as sample No. 8 in Example 2 was conducted as follows:

By the same reaction operating method as in Example 5 a reaction was conducted using a reaction solution consisting of 17% AN, 9% water, 73% acetonitrile and 1% tetraethylarsonium iodide by weight. Then, there was obtained a reaction completed solution containing 7% AN, 10% ADN, 7% water, 74% acetonitrile and 2% of the other compounds by weight.

Example 8

The hydrodimerizing reaction which by-produced the sodium bicarbonate treated as sample No. 9 in Example 2 was conducted as follows:

By the same reaction operating method as in Example 5 a reaction was conducted using a reaction solution consisting of 33% AN, 25% water, 41% dimethylacetamide and 1% tetraethylammonium p-toluene sulfonate by weight. Then, there was obtained a reaction completed solution containing 10% AN, 23% ADN, 20% water, 45% dimethylacetamide and 2% of the other compounds by weight.

In Examples 1 and 2 acrylonitrile was used as a washing agent, but a mixture of acrylonitrile and an organic solvent which is used in a hydrodimerizing reaction can be used also.

Illustrative hydrodimerizing reactions which also by-produce sodium bicarbonate suitable for treatment according to this invention are disclosed in pending applications Ser. No. 707,546, filed Feb. 23, 1968; Ser. No. 665,603, filed Sept. 5, 1967, now abandoned; Ser. No. 675,378, filed Oct. 16, 1967, now abandoned and Ser. No. 599,893, filed Dec. 7, 1966, now abandoned.

What is claimed is:

1. A method of treating sodium bicarbonate mixture containing a small amount of sodium carbonate and by-produced in a process for producing adiponitrile by hydrodimerizing acrylonitrile involving the addition of sodium amalgam and carbon dioxide in an aqueous solution of acrylonitrile to form a reaction solution, said method comprising separating said by-produced sodium bicarbonate mixture from the reaction solution, washing said sodium bicarbonate mixture with from about 1 to about 15 times the weight thereof of acrylonitrile, and calcining the washed sodium bicarbonate mixture at a temperature of about 70° C. to about 300° C. for from about 20 minutes to 2 hours to convert said sodium bicarbonate to sodium carbonate while, at the same time, evaporating from the product said acrylonitrile together with organic substances deposited on the sodium bicarbonate mixture from said reaction solution.

2. The method as claimed in claim 1 wherein the calcination is carried out at a temperature of about 150° C. to about 250° C.

3. The method as claimed in claim 1 wherein the amount of the acrylonitrile used for washing is about 2 to about 4 times the weight of the sodium bicarbonate.

4. A method of treating sodium bicarbonate mixture containing a small amount of sodium carbonate and by-produced in a process for producing adiponitrile by hydrodimerizing acrylonitrile involving the addition of sodium amalgam and carbon dioxide to an aqueous solution of acrylonitrile in the presence of a member selected from the group consisting of a catalyst, a solvent and mixtures thereof to form a reaction solution, said method comprising separating said by-produced sodium bicarbonate mixture from the reaction solution, washing said by-produced sodium bicarbonate mixture with from about 1 to about 15 times the weight thereof of acrylonitrile, calcining the washed sodium bicarbonate mixture at a temperature of about 70° C. to about 250° C. for from about 20 minutes to 2 hours to convert the sodium bicarbonate to sodium carbonate while at the same time, evaporating from the product said acrylonitrile together with organic substances deposited on the sodium bicarbonate mixture from said reaction solution and further heating the calcined sodium carbonate in air at a temperature of about 250° C. to about 850° C. for from about 15 minutes to about 2 hours to further purify said sodium carbonate.

5. The method as claimed in claim 4 wherein the calcination is carried out at a temperature of about 150° C. to about 250° C.

6. The method according to claim 4 wherein the further heating in air is carried out at a temperature of about 350° C. to about 850° C.

7. The method as claimed in claim 4 wherein the calcined sodium carbonate is first mixed with from about 16% to about 18% by weight of water and is then subjected to said further heating step.

8. The method as claimed in claim 1 wherein a mixture of acrylonitrile and an organic solvent which is used in the hydrodimerizing reaction is used as a washing agent.

9. The method as claimed in claim 4 wherein a mixture of acrylonitrile and an organic solvent which is used in the hydrodimerizing reaction is used as a washing agent.

References Cited
UNITED STATES PATENTS

| | | | |
|---|---|---|---|
| 3,479,386 | 11/1969 | Gregory | 260—465.8 |
| 3,482,934 | 12/1969 | Di Bello et al. | 23—63 |
| 3,493,329 | 2/1970 | Stiers | 23—63 |
| 3,529,011 | 9/1970 | Badham | 260—465.8 |

JOSEPH P. BRUST, Primary Examiner

U.S. Cl. X.R.

260—465.8 A